Sept. 19, 1961     C. J. BRUKNER     3,000,399
LOCK PROOF TWO POSITION SPOOL VALVE
Filed Sept. 12, 1958
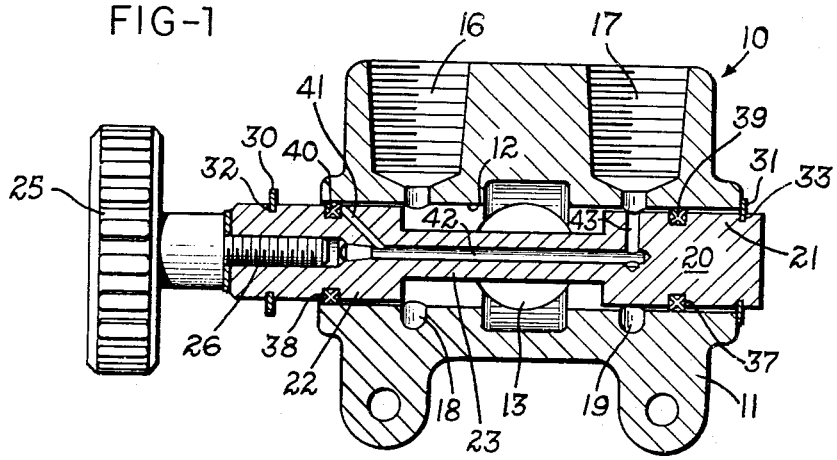
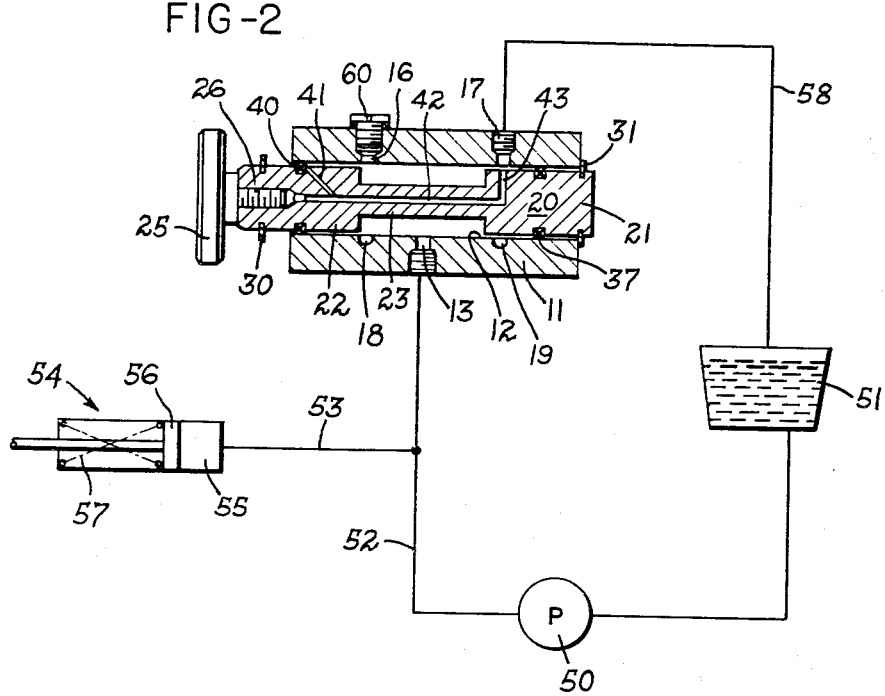
INVENTOR.
CLAYTON J. BRUKNER
BY
Marshal, Biebel, French & Bugg
ATTORNEYS

United States Patent Office 3,000,399
Patented Sept. 19, 1961

3,000,399
LOCK PROOF TWO POSITION SPOOL VALVE
Clayton J. Brukner, % Waco Aircraft Co., Troy, Ohio
Filed Sept. 12, 1958, Ser. No. 760,702
5 Claims. (Cl. 137—625.48)

This invention pertains to hydraulic systems and more particularly to a hydraulic control valve.

The invention is especially concerned with hydraulic systems wherein it is desired to maintain the cost and complexity of the component parts at a minimum while still providing maximum ease and efficiency of operation. For example, the invention is particularly applicable to a simple hydraulic system which incorporates a control valve operable selectively to direct the supply pressure to a hydraulic motor or to supply tank, depending upon the desired actuation of the motor. It is of course possible to control such a system by means of a conventional four-way valve, but such valves are substantially more costly than is desired for the preferred practice of the invention. It would similarly be possible to employ a torque-operated valve such as a plug valve, but since such valves require rotation of an operating member, they introduce corresponding mechanical problems.

It has therefore been determined that for the purposes of this invention, it is preferable to employ a pressure-balanced spool type valve, which has the advantage of simplicity of construction and operation in that simple reciprocation of the spool is the only mechanical movement required, and also since the spool is readily constructed to present equal and opposite areas to the supply pressure and therefore will remain in hydraulic equilibrium. Such valves, however, when constructed in the simplest form compatible with minimum cost, offer another complication which heretofore made them unsuitable for the use contemplated by the present invention.

More specifically, it is necessary to seal the enlarged end portions of the valve spool against leakage therepast, and this may be accomplished effectively and economically by means of elastomeric sealing rings of the type known generally as O-rings or quad rings. However, when such valve is in operation under conditions applying inlet pressure to an operating port, there is a definite possibility that the pressure fluid will leak sufficiently along the spool to deform the adjacent sealing ring into effectively locking engagement with the bore, and at normal supply pressures, this locking engagement may easily be sufficient to prevent subsequent manual movement of the spool. This locking action is not a disadvantage when such a valve is used in the conventional manner as a selector or directional valve in combination with a separate operating valve, since when the pressure is relieved at the operating valve, the locking pressure is simultaneously relieved. The present invention, however, is applicable to a hydraulic system in which a simple spool valve is to be used as the only operating valve, and in such cases the locking tendency of such valves presents serious difficulties.

It is therefore an object of this invention to provide a spool valve as outlined above wherein spool locking due to pressure build up at the elastomeric sealing ring is obviated.

Another object of this invention is to provide a relatively inexpensive spool-type transfer valve as outlined above of such construction that it may be utilized as the only control valve in a hydraulic system.

A further object of this invention is to provide a spool valve as outlined above utilizing elastomeric sealing rings to seal the spool with respect to the bore wherein the rings remain freely movable with respect to the bore during the application of hydraulic pressure.

Other objects and advantages of the invention will be apparent from the following description, the accompanying drawings and the appended claims.

In the drawing:

FIG. 1 is a sectional plan view through a balanced spool transfer valve which is modified according to the teachings of this invention for use as a control valve; and FIG. 2 is a somewhat diagrammatic view of the control valve in a typical hydraulic circuit.

Referring to the drawing, which illustrates a preferred embodiment of the invention, FIG. 1 shows a typical spool-type transfer valve indicated generally at 10 and having a cast valve body 11. A cylindrical bore 12 is formed within body 11, and an inlet port 13 is provided intermediate the ends of bore 12. A pair of spaced outlet ports 16 and 17 are formed in body 11 to be in communication with a pair of outlet grooves 18 and 19 extended peripherally of the bore 12 at opposite sides of the inlet port 13 and therefore annular in shape as viewed axially of the bore.

A cylindrical valve spool 20 is reciprocally received within bore 12 and includes a pair of enlarged bore engaging valve portions 21 and 22 which extend through the ends of the bore 12 and which are connected with each other by a reduced center portion 23. The spool 20 is provided with an actuating knob 25 secured on the portion 22 by stud bolts 26.

The extent of reciprocal axial movement through which the spool 20 may be moved by the knob 25 is limited and defined by a pair of spring snap rings 30 and 31 which are received within complementary circumferential grooves 32 and 33 located on the periphery of the portions 21 and 22 to lie outside the body 11. The resulting extent of axial movement of the spool is such that either of the outlet grooves 18 and 19 may selectively be covered and uncovered by the reciprocal placement of the spool 20 to place either one of the outlet ports 16 and 17 in communication with the inlet port 13.

Means are provided by which the portions 21 and 22 may hydraulically be sealed with respect to the bore 12. The portions 21 and 22 respectively include ring-receiving grooves or recesses 37 and 38 extending circumferentially thereon and adapted to receive elastomeric sealing rings 39 and 40 of such cross sectional diameter as to form a fluid seal between the valve spool 20 and the bore 12. In addition, the spool 20 incorporates passageways 41, 42 and 43 which provide a venting connection opening into the recess 38 at a position between the ring 40 and the interior of the valve. The passageways 40–43 lead to a region of low pressure at the outlet port 17 when the spool is in its closed position with respect to port 17 as shown in FIG. 1.

FIG. 2 illustrates a typical application of the valve 10 as the control valve of a hydraulic system in which the construction of the valve as just described makes it possible to shift the spool between open and closed positions without any locking tendency. In the circuit of FIG. 2, a pump 50 supplies hydraulic fluid under pressure from a supply tank 51 through lines 52–53 to a single acting hydraulic motor 54 comprising a cylinder 55, piston 56 and return spring 57. The line 52 is also connected to the inlet port 13 of the valve 10, and the outlet port 17 is connected by a line 58 to the supply tank 51. The port 16, however, is shown as closed by a plug 60.

In the operation of the circuit of FIG. 2, when the spool 20 is moved to its open position with respect to port 17, i.e. to the limit of its travel to the right of FIG. 2, the line pressure will simply be circulated through the valve to the tank 51, and the piston 56 will stay in retracted position. When the spool 20 is moved to its other position as shown in FIG. 2, the port 17 will be closed, and therefore the line pressure will be supplied through the line 52 to operate the piston 56.

With the spool 20 in the position shown in FIG. 2, it will be seen that line pressure is effective against the closed port 16, and the pressure fluid will normally tend to leak along the surface of the spool portion 22 into the recess 38 under elevated pressure operations. In the absence of the invention, this leakage pressure will produce distortion of the sealing ring 40 into the undesired locking relation with respect to the bore 12 such that the spool cannot be moved to its other position except by means of a force greater than that of direct manual ability. With the spool constructed as described in accordance with the invention, however, whatever pressure fluid leaks to the recess 38 can bleed through the passageways 41—43 to the outlet port 17 and thence back to the tank. The sealing ring 40 therefore remains under only atmospheric pressure, so that while it will still effect the desired sealing against losses outside the system, it will not interfere with free movement of the valve spool to its other position when it is desired to retract the piston 56.

It will accordingly be seen that the invention thus provides a valve of very simple and economical construction which can be used efficiently as the sole control valve of a hydraulic circuit. It will also be apparent that either of the ports 16 and 17 may be used as the outlet port provided the arrangement of venting passageways within the spool provides pressure relief for the sealing ring which is exposed to line pressure in the closed position of the valve.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A valve of the character described comprising a valve body having a cylindrical bore therethrough, an outlet port adjacent one end of said bore, an inlet port intermediate said outlet port and the other end of said bore, a pressure balanced spool reciprocable in said bore and including a pair of spaced bore-engaging portions connected by a reduced central portion overlying said inlet port, means defining closed and open limit positions for said spool wherein one of said bore-engaging portions selectively closes said outlet port and opens said outlet port to said inlet port, the other of said bore-engaging portions having a circumferential groove therein, an elastomer sealing ring received in said groove to seal between said spool portion and said bore, and means in said spool defining a passageway connecting at one end with said groove and at the other with said outlet port in said closed position of said spool to provide for continuous venting of said groove to said outlet port in closed position.

2. A valve of the character described comprising a valve body having a cylindrical bore therein, an outlet port adjacent one end of said bore, an inlet port intermediate said outlet port and the other end of said bore, a pressure balanced spool reciprocable in said bore and including a pair of spaced bore-engaging portions connected by a reduced central portion overlying said inlet port, means for reciprocating said spool between positions wherein one of said bore-engaging portions selectively covers and uncovers said outlet port, the other of said bore-engaging portions having a circumferential groove therein, an elastomer seal received in said groove to seal between said spool portion and said bore, and means in said spool defining a passageway connecting at one end with said groove at a position on said groove between said ring and said inlet port and at the other with said outlet port to provide for the bleed off of pressure from said groove to said outlet port.

3. A valve of the character described comprising a valve body having a cylindrical bore therein, means defining a peripheral groove formed in said bore adjacent one end thereof, an outlet port opened into said groove, an inlet port intermediate said outlet port and the other end of said bore, a pressure balanced spool reciprocable in said bore and including a pair of spaced bore-engaging portions connected by a reduced central portion overlying said inlet port, means for reciprocating said spool between positions wherein one of said bore-engaging portions selectively covers and uncovers said groove, the other of said bore-engaging portions having a circumferential recess therein, an elastomer sealing ring received in said recess to seal between said spool portion and said bore and means in said spool defining a passageway connecting at one end with said recess at a position on said groove between said ring and said inlet port and at the other with said groove to vent said recess to said outlet port.

4. A lock proof, two position balanced spool valve comprising a valve body having a cylindrical bore therethrough, a first selectable port opening into said bore, a second selectable port opening into said bore in spaced relation to said first port, a third port opening into said bore intermediate said first and second ports, a pressure balanced spool reciprocable in said bore including a pair of spaced bore engaging portions movable between limit positions alternately into flow stopping relations over said first and second ports connected by a reduced central portion overlying said third port, one of said bore engaging portions having a circumferential groove therein positioned on a side of one of said first and second ports remote from said third port, an elastomeric ring in said groove in sealing relation with said bore and providing a fluid seal for said spool, and means in said spool defining a passageway connecting at one end with said groove and arranged at the other end to discharge adjacent the other of said first and second ports to provide for the bleed off of pressure tending to lock said spool in said bore.

5. A lock proof, two position balanced spool valve comprising a valve body having a cylindrical bore therethrough, a first selectable port opening into said bore, a second selectable port opening into said bore in spaced relation to said first port, a third port opening into said bore intermediate said first and second ports, a pressure balanced spool reciprocable in said bore including a pair of spaced bore engaging portions movable between limit positions alternately into flow stopping relations over said first and second ports connected by a reduced central portion overlying said third port, one of said bore engaging portions having a circumferential groove therein positioned on a side of one of said first and second ports remote from said third port, an elastomeric ring in said groove in sealing relation with said bore and providing a fluid seal for said spool, and means in said spool defining a passageway opening at one end into said groove at a position between the ring and said one port and arranged at the other end to discharge adjacent the other of said first and second ports to provide for the bleed off of pressure tending to lock said spool in said bore.

References Cited in the file of this patent

UNITED STATES PATENTS

| | | |
|---|---|---|
| 2,449,123 | Kimball et al. | Sept. 14, 1948 |
| 2,671,345 | Rubin | Mar. 9, 1954 |
| 2,675,024 | Clark | Apr. 13, 1954 |
| 2,713,989 | Bryant | July 26, 1955 |
| 2,723,681 | MacGlashen et al. | Nov. 15, 1955 |